Feb. 9, 1932. H. W. HILTON 1,844,762
LEVELING INSTRUMENT
Filed Dec. 12, 1928 2 Sheets-Sheet 1
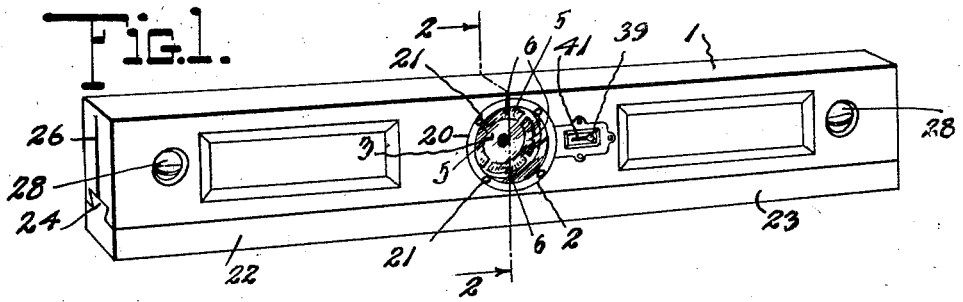
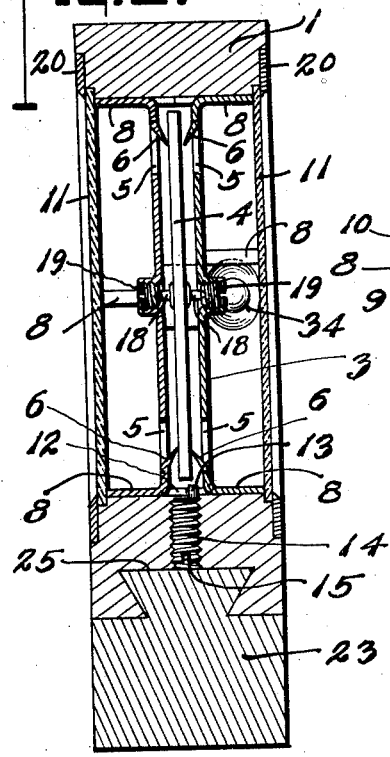
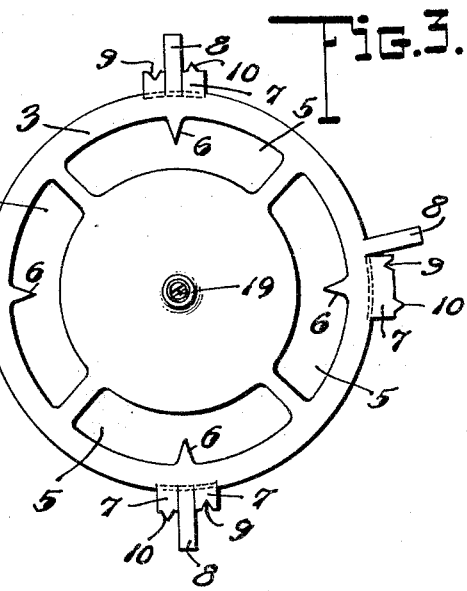
Inventor
H. W. Hilton
By Robb & Robb
Attorneys Feb. 9, 1932. H. W. HILTON 1,844,762
LEVELING INSTRUMENT
Filed Dec. 12, 1928  2 Sheets-Sheet 2
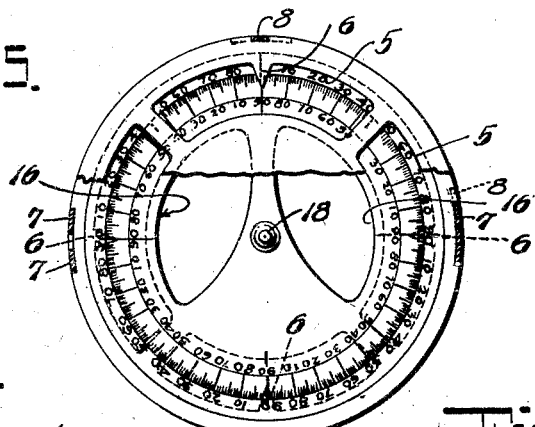
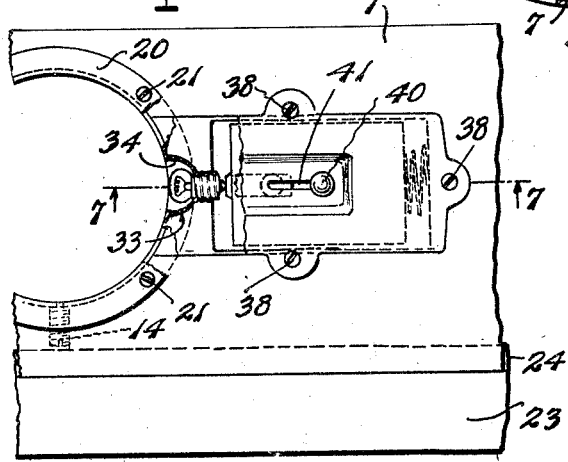
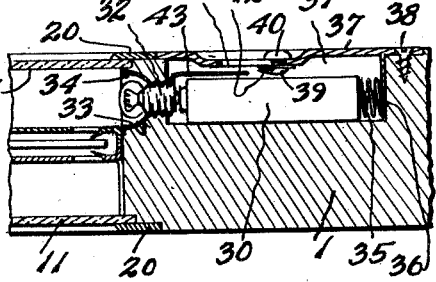
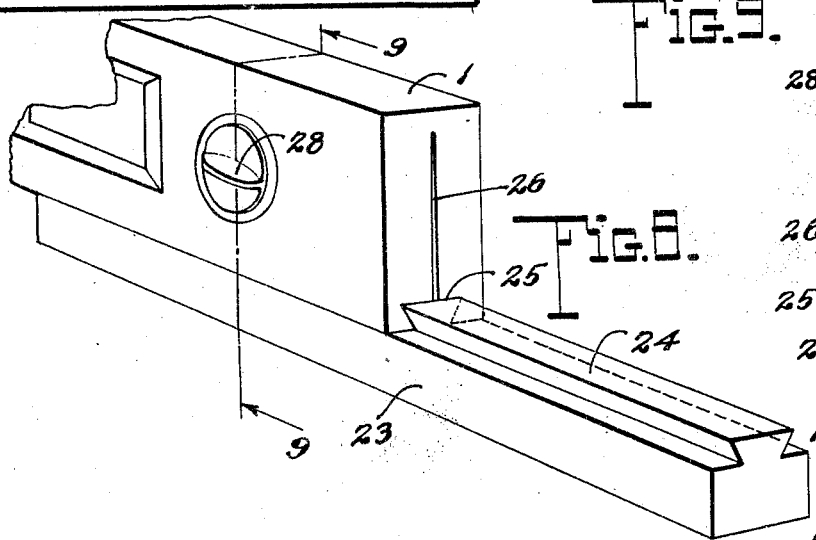
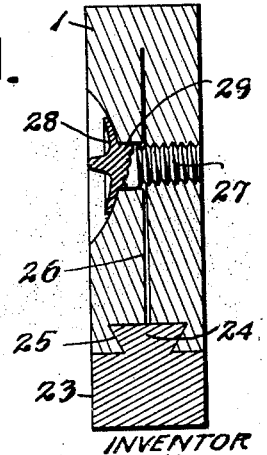

Patented Feb. 9, 1932

1,844,762

UNITED STATES PATENT OFFICE

HERBERT W. HILTON, OF RACINE, WISCONSIN

LEVELING INSTRUMENT

Application filed December 12, 1928. Serial No. 325,628.

This invention pertains to leveling instruments and more particularly to that type of level which has a pendulum indicating mechanism for indicating the degree of angularity with respect to horizontal or vertical.

In the forms of level indicating mechanisms commonly in use at the present time, each is more or less adapted for use in a particular class of work, as for example, the brick layer's level, the carpenter's level, the mechanic's level, etc. Generally speaking, these levels are very difficult to use when working in dark places or where the illumination of the place in which the work is being done strikes the level at such an angle as to cause errors in reading the indicator or complete inability to read it.

Comparatively few levels permit any zero adjustment, and those that do usually complicate the construction of the devices to such an extent as to render them quite expensive to manufacture and consequently more expensive than the average workman is able or is willing to pay for.

As a rule, the average workman prefers to use a medium sized level to conserve space in his tool kit for other tools, and a medium sized level is much lighter and handier to carry around. However, for spanning across open spaces, it is obvious that such a small level would be of little use.

It is, therefore, an object of my invention to provide for a leveling device which may be extended to a considerably greater length than its normal longitudinal dimension.

A further object of my invention is to provide a level which is adaptable for general use, being equally useful to the woodworker, builder, contractor, engineer, mechanic, etc.

A still further object of my invention is to provide a device which quickly and accurately determines the position of the object to which it is applied and which permits of an easy and accessible zero adjustment.

Another object of my invention is to provide for a self contained illuminating device whereby reading of the indicating device is greatly facilitated.

Other and further objects and advantages of the invention will be hereinafter set forth and the novel features thereof defined by the appended claims.

In the drawings:

Fig. 1 is a perspective view of my leveling instrument;

Fig. 2 is a cross sectional view taken on line 2—2 of Fig. 1;

Fig. 3 is a plan view of one half of the skeleton casing showing it as it is stamped out of the blank;

Fig. 4 is a detail view of the assembled skeleton casing, showing the interlocking lugs and the adjusting slot;

Fig. 5 is a detail view of the indicator dial located within the skeleton casing, parts of said casing being broken away;

Fig. 6 is a detail view of the illuminating device for the indicating mechanism;

Fig. 7 is a cross sectional view taken on line 7—7 of Fig. 6;

Fig. 8 is a perspective view of the extension device; and

Fig. 9 is a cross sectional view taken on line 9—9 of Fig. 8.

Like numerals refer to like parts in the several figures of the drawings in which 1 denotes the stock of the level, preferably formed of wood, at the center of which is located the level indicating mechanism unit 2, said level indicating mechanism consisting of a skeleton casing or spider 3 formed by complemental halves or sections, and between which is located the indicator dial 4. These casing sections 3 are preferably stamped from sheet metal blanks or plates and are provided with openings 5 through which the indicator dial may be seen. Projecting into these openings are the pointers 6 which are bent inwardly toward the indicator dial to cause their points to be relatively close to the indicia on the dial, thereby facilitating the reading thereof.

At intervals around the outer periphery of the sections of the indicator dial casing are formed sets of lugs 7 and 8 which are adapted to be bent at right angles to the plane of the casing sections and opposite to each other. Each of the lugs 7 is further formed with a groove or notch 9 and a tongue or projection 10 which engage complemental notches and tongues on the lug of the opposite section of the casing, thereby preventing any relative shifting of the two sections by virtue of the interlocking of these tongues and grooves formed on the lugs.

The lugs 8 are substantially rectangular in shape and when bent at right angles to the casing sections to extend oppositely to the lugs 7, they act as spacers to hold the casing in intermediate position between the opposite crystals or glass enclosures 11. The formation of the lugs 8 at the center of the lugs 7 leaves an opening or adjusting slot 12 (see Fig. 4) when the said lugs are bent in opposite directions and the complemental sections of the casing are put together, and this slot is adapted to be engaged by an eccentric pin or stud 13 formed on one end of the adjusting screw 14, the opposite end having a screw driver engaging slot 15. Obviously, rotation of the adjusting screw will cause the eccentric pin to engage the side of the slot 12 and rotate the indicator casing within the aperture formed in the level stock for containing the indicating mechanism, thereby adjusting the position of the pointers 6 in respect to the readings on the indicator dial when checking the accuracy of the instrument. The dial may be graduated in any suitable manner, preferably into 360 degrees on both faces, said degrees being divided into four quadrants of 90 degrees each, and each quadrant being numbered to increase in both a clockwise and a counterclockwise direction. Portions of the central part of the dial are punched out, as at 16, to form a counterweight section 17, and the dial shaft 18 is pivoted in adjustable bearings 19 located in the opposite sections of the casing. Clamping rings 20, preferably inlaid flush with the faces of the stock of the level, are secured to the stock by screws 21, or in any suitable manner, and hold all the parts of the indicating mechanism in cooperative relation to each other.

The bottom of the stock of the level is provided with the extension means which consists of two slidable members 22 and 23 formed with dovetailed tongues 24 which are adapted to slide in a correspondingly shaped slot or groove 25 in the level stock. The stock is slit in a longitudinal direction at 26, said slit extending well up the vertical height thereof in order to allow a slight amount of flexibility between the opposite sections of the stock whereby the extensions 22 and 23 may be clamped in position, or to allow adjustment of the sliding friction by means of the clamping thumb screws 27 having winged heads 28 countersunk in the stock. The clamping is effected by forming the section of the stock opposite the screw head engaging section with threads for engagement with the threads on the screw, while the head engaging section is enlarged around the shank of the screw at 29. Thus rotation of the screw in one direction will cause the sections of the stock on opposite sides of the slit to be drawn together, and rotation in the opposite direction will allow the said sections to return to normal relaxed position.

The illuminating device, as shown in Figs. 1, 6 and 7, consists of a dry battery 30 of the flashlight type located in a recess 31 in the stock at one side of the indicating mechanism, said battery being adapted to contact with a light bulb shank 32 which is threaded in the partition between the battery recess or compartment and the indicating mechanism so that the glass portion of the bulb is located in a recess 33, said recess having a reflecting surface, or being preferably fitted with a reflector shell 34 which has a threaded bushing for receiving the shank of the bulb. The spacing lug on the skeleton casing which would normally be formed equi-distance from the lugs on either side and be directly in front of the bulb is offset in order to prevent any obstruction of the light rays reflected onto the indicator dial. The battery is held in contact with the tip of the bulb shank by means of a helical spring 35, one end of which is in contact with the end of the battery while the other end contacts with a metal plate 36 which is joined to the face plate 37. This face plate is secured to the stock of the level by screws 38 and is preferably recessed flush with the surface of the stock. The face plate carries a thumb switch 39 which is recessed therein to minimize accidental shifting of or damage to the switch, said switch being of any suitable construction, but for illustrative purposes being shown as a thumb button 40 slidably engaged by a slot 41 in the face plate and carrying a resilient contact 42 which is adapted to engage a stationary contact 43 attached to the bushing for the bulb shank. Thus the circuit for the light is traced from the battery 30 to the side of the bulb filament connected to the tip of the shank, the other side of the filament connected to the threaded portion of the shank, stationary contact 43, movable contact 42 connected to button 40, through face plate 37, plate 38, spring 35, and back to the battery again. By means of this construction the indicator may be illuminated at the will of the user.

The use of my level indicating instrument is obvious and may be briefly described as follows: The bottom face of the level is rested flat on the surface of the object to be leveled and the indicator dial immediately takes up the position under the action of gravity so that the counter-weighted portion is downward. By reading the degree graduations opposite the pointers, the exact angular position of the object becomes known. If the illumination is insufficient to read the dial, movement of the thumb switch in the slot will close the battery circuit and light the bulb, thereby greatly increasing the illumination. In the event the level is not long enough to span across an opening, the extension members 21 and 23 may be slid outwardly at each end of the level, thereby nearly doubling the original collapsed length of the level.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. An indicator unit for levels comprising a circular casing having a transverse slot therein, and an adjusting screw having an eccentric pin formed thereon to engage the said slot to rotatably shift the said casing upon rotation of said adjusting screw.

2. In a leveling instrument, a stock, an angle indicating mechanism located in the stock comprising a pendulous indicator dial, and means for rotatably supporting said dial, said means comprising a skeleton casing having opposite complemental sections adapted to interlock with each other to prevent relative movement between the said sections.

3. In a leveling instrument, a stock, an angle indicating mechanism located in the stock comprising a pendulous indicator dial having indicia on the faces thereof, a casing for the dial having opposite complemental sections formed with lugs at intervals around the periphery of the said sections, said lugs having interlocking instrumentalities formed thereon, and means for maintaining the sections in interlocking position.

4. In a leveling instrument, a stock, an angle indicating mechanism located in the stock comprising an eccentrically weighted indicator dial having indicia on the faces thereof, a casing for the dial formed by opposite complemental sections, each section having openings therein for viewing the said indicia on the dial, and having lugs formed at intervals around the sections, each of said lugs having a notch and a tongue for respectively engaging a tongue and notch in the lugs on the opposite section, and means for holding the said opposed sections in interlocking position.

5. In a leveling instrument, a stock, an indicating mechanism located in said stock and comprising an indicator dial, a casing for said dial having opposite complemental sections in interlocking relation with each other, crystals spaced from said casing, spacing lugs formed on the said sections for engaging the crystals for maintaining the sections in interlocking relation to each other, and means for holding said crystals in cooperative relation with the said spacing lugs.

6. In a leveling instrument, a stock, an indicating mechanism located in said stock and comprising an indicator dial, a casing for said dial having opposite complemental sections in interlocking relation with each other, said complemental sections having a transverse slot therein crystals spaced from said casing, spacing lugs formed on the said sections for engaging the crystals for maintaining the sections in interlocking relation to each other, means for holding the said crystals in cooperative relation to the said spacing lugs, and means for rotatably shifting the said casing within the stock, said latter means comprising an adjusting screw having an eccentric pin formed on one end thereof, said eccentric pin being adapted to engage said transverse slot in the complemental sections.

7. In a leveling instrument, a stock, and an indicating mechanism located in said stock comprising complemental sections forming a casing, an indicator dial rotatably carried between said sections, said complemental sections having two sets of lugs formed at intervals around the outer periphery thereof, certain of said lugs of one set being formed in the middle of certain of said lugs of the second set, each of the lugs of one set being adapted to be bent in an opposite direction to the lugs of the other set, both sets being adapted to be bent at right angles to the plane of the casing sections, certain of said first set of lugs thereby, leaving a transverse slot in certain of the lugs of the second set when the complemental sections are placed together to form the casing.

8. In a leveling instrument, a stock, an indicating mechanism located in said stock comprising complemental sections forming a shiftable casing, an indicator dial rotatably carried between said sections, said complemental sections having two sets of lugs formed at intervals around the outer periphery thereof, certain of said lugs of one set being formed in the middle of certain of said lugs of the second set, each of the lugs of one set being adapted to be bent in an opposite direction to the lugs of the other set, both sets being adapted to be bent at right angles to the plane of the casing sections, certain of said first set of lugs thereby leaving a transverse slot in certain of the lugs of the second set when the complemental sections are placed together to form the casing, and means engagable with said transverse slot for shifting said casing.

In testimony whereof I affix my signature.

HERBERT W. HILTON.